United States Patent
Oh

(10) Patent No.: US 7,956,923 B2
(45) Date of Patent: Jun. 7, 2011

(54) MOBILE TERMINAL HAVING IMAGE CORRECTOR

(75) Inventor: Eun-Jung Oh, Suwon-si (KR)

(73) Assignee: Samsung Mobile Display Co., Ltd., Giheung-Gu, Yongin, Gyunggi-Do (KR)

(*) Notice: Subject to any disclaimer, the term of this patent is extended or adjusted under 35 U.S.C. 154(b) by 770 days.

(21) Appl. No.: 11/354,094

(22) Filed: Feb. 15, 2006

(65) Prior Publication Data

US 2006/0244857 A1    Nov. 2, 2006

(30) Foreign Application Priority Data

Apr. 29, 2005   (KR) .................. 10-2005-0036390

(51) Int. Cl.
*H04N 5/222* (2006.01)
*H04N 9/73* (2006.01)
*H04N 5/202* (2006.01)

(52) U.S. Cl. ........... 348/333.12; 348/333.01; 348/223.1; 348/254

(58) Field of Classification Search ........... 348/222.1, 348/223.1, 230.1, 234, 254, 255, 333.01; 345/102

See application file for complete search history.

(56) References Cited

U.S. PATENT DOCUMENTS

| | | | | |
|---|---|---|---|---|
| 5,194,943 A | * | 3/1993 | Tomita et al. | 348/255 |
| 5,337,068 A | * | 8/1994 | Stewart et al. | 345/88 |
| 5,987,167 A | * | 11/1999 | Inoue | 382/167 |
| 7,061,520 B2 | * | 6/2006 | Choi | 348/14.02 |
| 2002/0102938 A1 | * | 8/2002 | Tsubaki et al. | 455/3.06 |
| 2002/0154238 A1 | * | 10/2002 | Hayashi | 348/333.01 |
| 2004/0058714 A1 | * | 3/2004 | Sawamura | 455/566 |
| 2004/0239774 A1 | * | 12/2004 | Takeshita | 348/223.1 |

FOREIGN PATENT DOCUMENTS

| | | |
|---|---|---|
| JP | 06-245100 | 9/1994 |
| JP | 07-245764 | 9/1995 |
| JP | 08-023461 | 1/1996 |
| JP | 2005-005791 | 1/2005 |
| KR | 10-2002-0043177 | 6/2002 |
| KR | 10-2004-0102442 | 12/2004 |

OTHER PUBLICATIONS

Japanese Office Action issued on Oct. 30, 2007, corresponding to Japanese Patent Application No. 2005-213155.
Korean Office Action for Korean Patent Application No. 2005-36390, issued on Sep. 20, 2006.

* cited by examiner

*Primary Examiner* — Sinh Tran
*Assistant Examiner* — Mark Monk
(74) *Attorney, Agent, or Firm* — Robert E. Bushnell, Esq.

(57) ABSTRACT

A mobile terminal has an image corrector which includes a comparator for receiving a first image signal photographed by a camera in a camera mode and a second image signal displayed in a normal mode, and for comparing them with a reference signal to generate a deviation signal, and a corrector for receiving the deviation signal from the comparator, and for supplying the first or second image signal, in which white balancing and gamma are corrected, in response to the deviation signal so that luminance and white balance of the first image signal displayed in the camera mode become equal to or similar to luminance and white balance of the second image signal displayed in the normal mode.

8 Claims, 4 Drawing Sheets

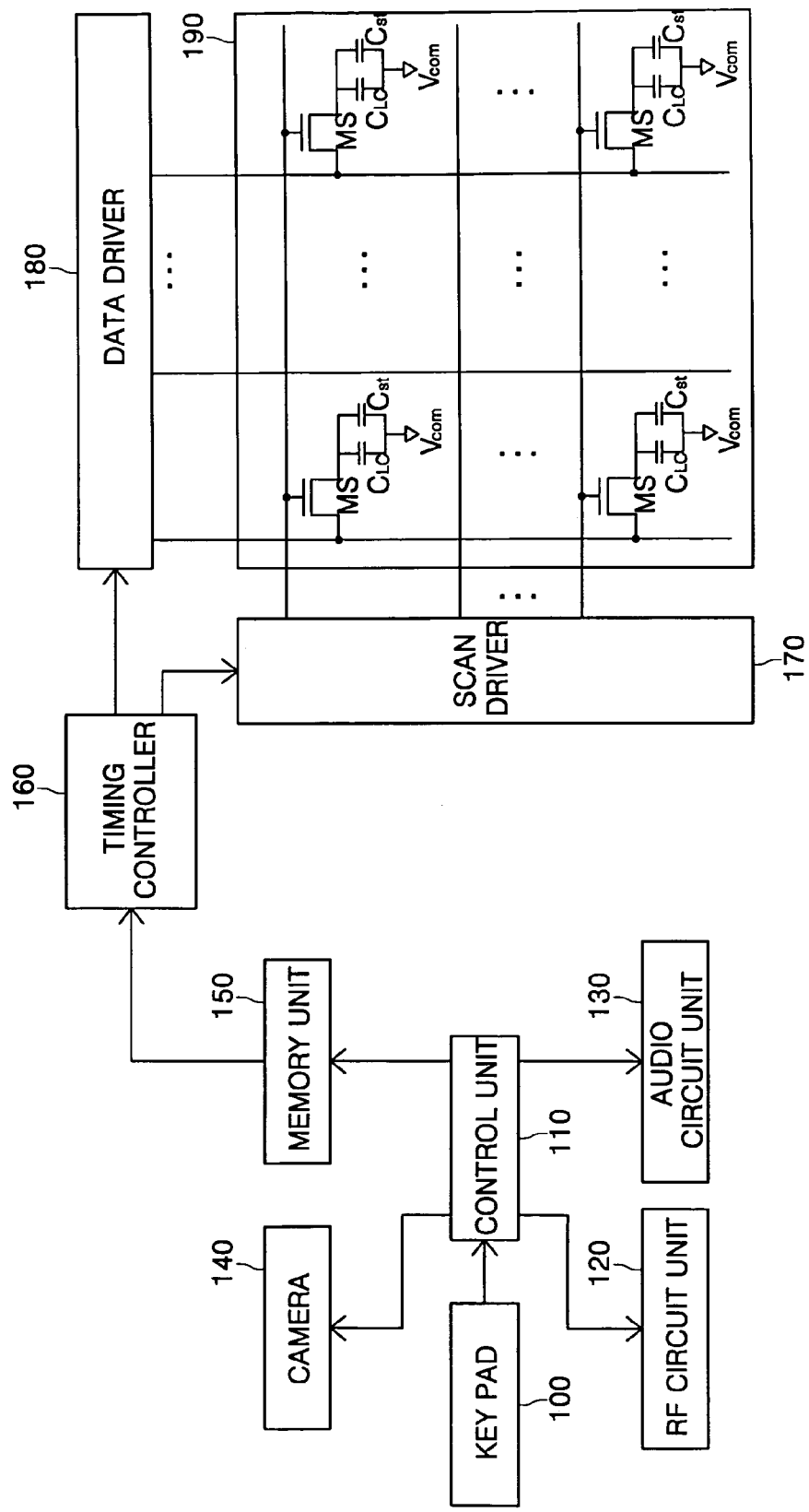

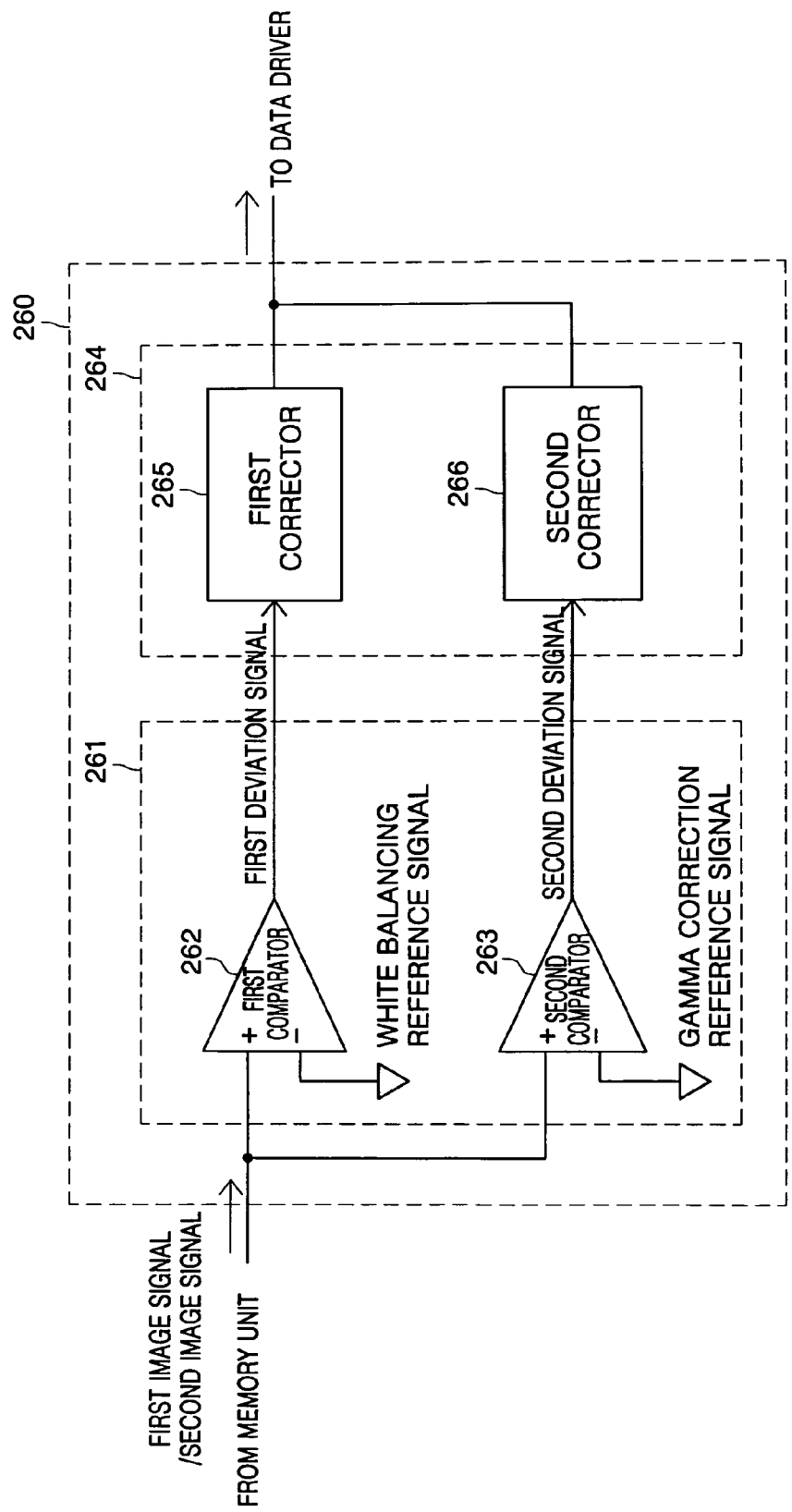

MOBILE TERMINAL HAVING IMAGE CORRECTOR

CLAIM OF PRIORITY

This application makes reference to, incorporates the same herein, and claims all benefits accruing under 35 U.S.C. §119 from an application earlier filed in the Korean Intellectual Property Office on Apr. 29, 2005 and there duly assigned Serial No. 2005-36390.

BACKGROUND OF THE INVENTION

1. Technical Field

The present invention relates to a mobile terminal having a camera, and more particularly, to a mobile terminal having an image corrector capable of causing an image displayed in a camera mode to have the same luminance and white balance as an image displayed in a normal mode.

2. Related Art

A mobile terminal includes: a key input unit for supplying a selection signal for selecting a camera mode or a normal mode; a central processing unit for receiving the mode selection signal, and for supplying a camera mode control signal or a normal mode control signal; a camera for photographing an external image in response to the camera mode control signal, and for correcting a first photographed image signal to form an output; a memory unit for storing the first corrected image signal from the camera and a second image signal to be displayed in the normal mode; a liquid crystal display panel for displaying the first image signal or the second image signal in response to the mode control signal; a scan driver for supplying a scan signal to the liquid crystal display panel; a data driver for supplying a data signal to a pixel selected by the scan signal; and a timing controller having the liquid crystal display panel and an image corrector for correcting the second image signal, and for supplying a control signal for controlling the scan driver and the data driver. In addition, the mobile terminal further includes a radio frequency (RF) unit for performing communication and an audio circuit unit for producing an audio signal.

When the camera mode selection signal is supplied to the central processing unit by the key input unit, and the central processing unit then supplies the camera mode selection signal to the liquid crystal display device, the first image which is photographed by the camera and corrected by the image corrector in the camera is displayed on the liquid crystal display panel. In addition, when the normal mode selection signal is supplied to the central processing unit by the key input unit, and the liquid crystal display device operates in the normal mode, the second image signal is displayed on the liquid crystal display panel. In this case, luminance and white balance of the first corrected image signal to be displayed in the camera mode are degraded compared to luminance and white balance of the second image signal to be displayed in the normal mode. In addition, an image correcting function of the camera is duplicated by an image correcting function of the timing controller, which causes a lot of time and effort to be expended in tuning the camera and the liquid crystal display device.

SUMMARY OF THE INVENTION

The present invention provides a mobile terminal which includes a comparator for receiving a first image signal photographed by a camera and a second image signal displayed in a normal mode, and for comparing them with a reference signal so as to generate a deviation signal, and an image corrector having a corrector for receiving a deviation signal from the comparator, and for supplying the first or second corrected image signal in response to the deviation signal.

Additional features of the invention will be set forth in the description which follows, and in part will be apparent from the description, or may be learned by practice of the invention.

The present invention discloses a mobile terminal which includes a camera for photographing an external image, a memory unit for storing a first image signal photographed by the camera in a camera mode and a second image signal displayed in a normal mode, and a liquid crystal display device for displaying the first or second image signal. The liquid crystal display device includes: a timing controller for receiving the first or second image signal from the memory unit, for comparing it with a reference signal so as to generate a deviation signal, and for supplying a first or second corrected image signal in response to the deviation signal; a liquid crystal display panel having a plurality of pixels formed by a plurality of scan lines and a plurality of data lines for displaying the first corrected image signal in the camera mode, and for displaying the second corrected image signal in the normal mode; a scan driver for supplying a scan signal to the liquid crystal display panel via the plurality of scan lines; and a data driver for supplying the first or second corrected image signal to the plurality of pixels selected by the scan signal via the plurality of data lines.

The timing controller preferably includes: a comparator for receiving the first or second image signal from the memory unit, and for comparing it with a reference signal so as to supply a deviation signal; and a corrector for supplying the first or second corrected image signal in response to the deviation signal supplied by the comparator.

The present invention also comprises a mobile terminal which includes a camera for photographing an external image, a memory unit for storing a first image signal photographed by the camera in a camera mode and a second image signal displayed in a normal mode, and a liquid crystal display device for displaying the first or second image signal. The liquid crystal display device includes: an image corrector for receiving the first or second image signal from the memory unit, for comparing it with a reference signal so as to generate a deviation signal, and for supplying a first or second corrected image signal in response to the deviation signal; a timing controller for supplying a control signal for displaying an image, and for supplying the first or second corrected image signal supplied by the image corrector; a liquid crystal display panel having a plurality of pixels formed by a plurality of scan lines and a plurality of data lines for displaying the first corrected image signal in the camera mode, and for displaying the second corrected image signal in the normal mode; a scan driver for supplying a scan signal to the liquid crystal display panel via the plurality of scan lines; and a data driver for supplying the first or second corrected image signal via the plurality of data lines to the plurality of pixels selected by the scan signal.

The image corrector preferably includes: a comparator for receiving the first or second image signal from the memory unit, and for comparing it with a reference signal so as to generate a deviation signal; and a corrector for supplying the first or second corrected image signal in response to the deviation signal supplied by the comparator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1A is a block diagram of a circuit of a mobile terminal in accordance with a first embodiment of the present invention.

FIG. 2B is a detailed block diagram of the image corrector of FIG. 2A.

DETAILED DESCRIPTION OF THE INVENTION

Figure 1B:
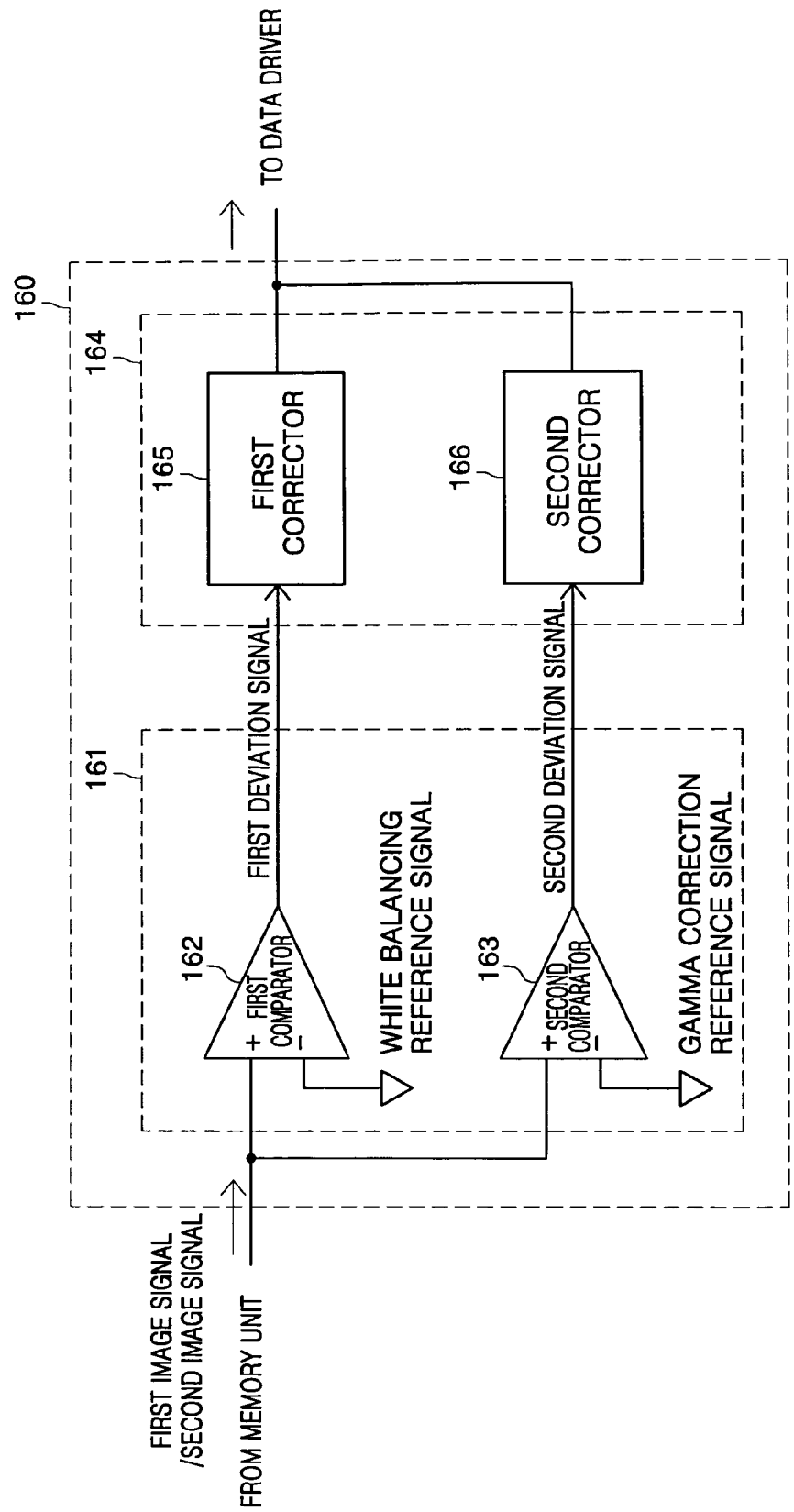
FIG. 1B is a detailed block diagram of the timing controller of FIG. 1A.

The present invention will now be described more fully hereinafter with reference to the accompanying drawings, in which preferred embodiments of the invention are shown.

First Embodiment

FIG. 1A is a block diagram of a circuit of a mobile terminal in accordance with the first embodiment of the present invention.

Referring to FIG. 1A, the mobile terminal includes a key pad 100, a control unit 110, a radio frequency (RF) circuit unit 120, an audio circuit unit 130, a camera 140, a memory unit 150, a timing controller 160, a scan driver 170, a data driver 180, and a liquid crystal display panel 190.

The key pad 100 supplies a selection signal for selecting a normal mode or a camera mode to the control unit 110.

The control unit 110 controls the mobile terminal by receiving the selection signal and supplying a normal mode control signal or a camera mode control signal. A first image signal is displayed in the normal mode.

The camera 140 receives the camera mode control signal, photographs an external image, and supplies a second image signal to the memory unit 150.

The memory unit 150 stores the first image signal displayed in the normal mode and the second image signal supplied by the camera 140, and supplies the first or second image signal to the timing controller 160 in response to the normal mode control signal or the camera mode control signal, respectively.

The timing controller 160 receives the first or second image signal in response to the respective mode control signal, compares the received image signal with a reference signal so as to generate a deviation signal, and supplies the first image signal or the second image signal, as corrected in response to the deviation signal, to the data driver 180. An image correcting operation of the timing controller 160 is described below with reference to FIG. 1B.

In addition, the timing controller 160 supplies a scan driver control signal and a data driver control signal, which are necessary for image display, to the scan driver 170 and the data driver 180, respectively.

The scan driver 170 supplies the scan signal to the liquid crystal display panel 190 via a scan line in response to the scan driver control signal, and selects a plurality of pixels arranged in the liquid crystal display panel 190.

The data driver 180 supplies the first or second corrected image signal via a data line to the plurality of pixels selected by the scan signal.

The liquid crystal display panel 190 includes a plurality of pixels, each defined at an intersection where a data line and a scan line cross each other. Each pixel of the plurality of pixels has a thin film transistor in which a source electrode and a gate electrode are connected to the data line and the scan line, respectively, a liquid crystal capacitor CLC connected between a common electrode and the drain electrode of the thin film transistor, and a storage capacitor CST connected to the common electrode and the drain electrode of the thin film transistor. The liquid crystal capacitor CLC has a predetermined orientation state in response to the data signal applied between the pixel electrode and the common electrode, that is, the first or second corrected image signal, so that a gray scale of the image is represented in response to the orientation state.

The RF circuit unit 120 performs communication for the mobile terminal. The RF circuit unit 120 includes an RF transmitter for up-converting and amplifying a frequency of a transmitted signal, and an RF receiver for amplifying a received signal and down-converting its frequency.

The audio circuit unit 130 receives a signal from the RF receiver and generates an audio signal.

FIG. 1B is a detailed block diagram of the timing controller of FIG. 1A.

Referring to FIG. 1B, the timing controller 160 includes a comparator 161 and a corrector 164.

The comparator 161 has a first comparator 162 and a second comparator 163.

The first comparator 162 receives the first or second image signal from the memory unit 150, and compares it with a white balancing reference signal so as to generate a first deviation signal, and supplies the first deviation signal to the first corrector 165.

The second comparator 163 receives the first or second image signal from the memory unit 150, and compares it with a gamma correction reference signal so as to generate a second deviation signal, and supplies the second deviation signal to the second corrector 166.

The corrector 164 has a first corrector 165 and a second corrector 166.

The first corrector 165 receives the first deviation signal, and supplies the first or second image signal, which is white-balanced in response to the deviation signal, to the data driver 180.

The second corrector 166 receives the second deviation signal, and supplies the first or second image signal, which is gamma-corrected in response to the deviation signal, to the data driver 180.

For example, when the first image signal and the second image signal supplied to the first comparator 162 and the second comparator 163 have no difference with respect to the white balance reference signal and the gamma correction reference signal, respectively, the first and second deviation signals are not generated. Accordingly, the white balancing and the gamma correction for the first or second image signal are not performed by the first corrector 165 and the second corrector 166, respectively. As a result, the first and second image signals are supplied to the data driver 180 as they are, so that they are displayed in the liquid crystal display panel 190.

When the first deviation signal is not generated but the second deviation signal is generated, the white balancing for the first or second image signal is not performed by the first corrector 165, but the gamma correction is performed by the second corrector 166 in response to the deviation signal. As a result, the first or second image signal, which is gamma-corrected by the second corrector 166, is supplied to the data driver 180 so that it is displayed in the liquid crystal display panel 190.

When the first deviation signal is generated but the second deviation signal is not generated, the white balancing for the first or second image signal is performed by the first corrector 165 in response to the deviation signal, but the gamma correction is not performed by the second corrector 166. As a result, the first or second image signal, which is white-balanced by the first corrector 165, is supplied to the data driver 180.

When both the first deviation signal and the second deviation signal are generated, the white-balancing and the gamma-correction for the first or second image signal are performed by the first and second corrector 165 and 166, respectively. As a result, the first or second image signal, which is white-balanced and gamma-corrected by the first and second corrector 165 and 166, respectively, is supplied to the data driver 180.

Second Embodiment

Figure 2A:
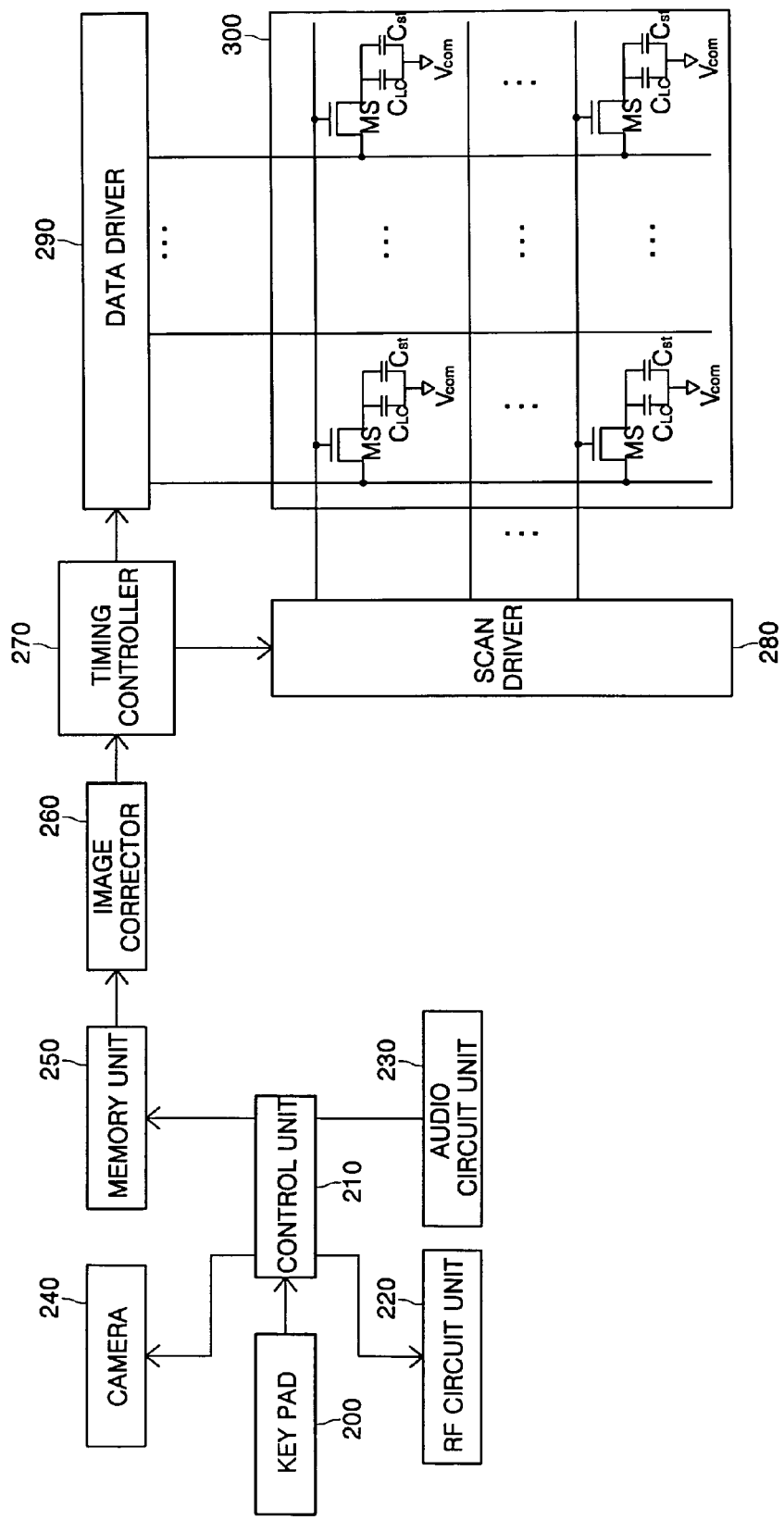
FIG. 2A is a block diagram of a circuit of a mobile terminal in accordance with a second embodiment of the present invention.

FIG. 2A is a block diagram of a circuit of a mobile terminal in accordance with the second embodiment of the present invention.

Referring to FIG. 2A, the mobile terminal includes a key pad 200, a control unit 210, an RF circuit unit 220, an audio circuit unit 230, a camera 240, a memory unit 250, an image corrector 260, a timing controller 270, a scan driver 280, a data driver 290, and a liquid crystal display panel 300.

The key pad 200 supplies a selection signal for selecting a normal mode or a camera mode to the control unit 210.

The control unit 210 supplies a normal mode control signal or a camera mode control signal to the mobile terminal in response to the selection signal.

The camera 240 photographs an external image in response to the camera mode control signal, and supplies the first photographed image signal to the memory unit 250.

The memory unit 250 stores the first image signal, and a second image signal displayed in the normal mode, and supplies the first or second image signal to the image corrector 260 in response to the camera mode control signal or the normal mode control signal, respectively.

The image corrector 260 receives the first or second image signal in response to the mode control signal, compares the received image signal with a reference signal so as to generate the deviation signal, and supplies the first image signal or the second image signal, which is corrected in response to the deviation signal, to the timing controller 270. An image correcting operation of the image corrector 260 is described below with reference to FIG. 2B.

The timing controller 270 receives the first or second image signal which is corrected, and supplies it to the data driver 290. In addition, the timing controller 270 supplies a scan driver control signal and a data driver control signal for image display to the scan driver 280 and the data driver 290, respectively.

The scan driver 270 supplies the scan signal to the liquid crystal display panel 300 via the scan driver in response to the scan driver control signal, and selects a plurality of pixels arranged in the liquid crystal display panel 300.

The data driver 290 supplies the first or second corrected image signal via a data line to the plurality of pixels selected by the scan signal.

The liquid crystal display panel 300 includes a plurality of pixels, each defined at the intersection of a data line and a scan line. Each pixel of the plurality of pixels has a thin film transistor in which the source electrode and the gate electrode are connected to the data line and the scan line, respectively, a liquid crystal capacitor CLC connected between a common electrode and the drain electrode of the thin film transistor, and a storage capacitor CST connected to the common electrode and the drain electrode of the thin film transistor. The liquid crystal capacitor CLC has a predetermined orientation state in response to the data signal applied between the pixel electrode and the common electrode, that is, the first or second corrected image signal, so that a gray scale of the image is represented in response to the orientation state.

The RF circuit unit 220 performs communication for the mobile terminal. The RF circuit unit 220 includes an RF transmitter for up-converting and amplifying a frequency of a transmitted signal, and an RF receiver for amplifying a received signal by means of low noise amplification, and for down-converting its frequency.

The audio circuit unit 230 receives a signal from the RF receiver and generates an audio signal.

FIG. 2B is a detailed block diagram of the image corrector of FIG. 2A.

Referring to FIG. 2B, the image corrector 260 includes a comparator 261 and a corrector 264.

The comparator 261 has a first comparator 262 and a second comparator 263.

The first comparator 262 receives the first or second image signal from the memory unit 250, and compares it with a white balancing reference signal so as to generate a first deviation signal, and supplies the first deviation signal to the first corrector 265.

The second comparator 263 receives the first or second image signal from the memory unit 250, and compares it with a gamma correction reference signal so as to generate a second deviation signal, and supplies the second deviation signal to the second corrector 266.

The first corrector 265 receives the first deviation signal, and supplies the first or second image signal, which is white-balanced in response to the deviation signal, to the timing controller 270.

The second corrector 266 receives the second deviation signal, and supplies the first or second image signal, which is gamma-corrected in response to the deviation signal, to the timing controller 270.

For example, when the first and second deviation signals are not generated, the white balancing and the gamma correction for the first and second image signals are not performed by the first corrector 265 and the second corrector 266, respectively. As a result, the first or second image signal is supplied to the timing controller 270 as they are.

When the first deviation signal is not generated but the second deviation signal is generated, the white balancing for the first or second image signal is not performed by the first corrector 265, but the gamma correction is performed by the second corrector 266 in response to the deviation signal. As a result, the first or second image signal, which is gamma-corrected by the second corrector 266, is supplied to the timing controller 270.

When the first deviation signal is generated but the second deviation signal is not generated, the white balancing for the first or second image signal is performed by the first corrector 265, but the gamma correction is not performed by the second corrector 266. As a result, the first or second image signal, which is white-balanced by the first corrector 265, is supplied to the timing controller 270.

When the first and second deviation signals are generated, the first or second image signal is white-balanced and gamma-corrected by the first corrector 265 and the second corrector 266, respectively, so that it is supplied to the timing controller 270.

The present invention includes a comparator for receiving a first or second image signal and for comparing it with a reference signal to generate a deviation signal, and a corrector for receiving the deviation signal and for supplying the first or second corrected image signal in response to the deviation signal. The first or second corrected image signal is displayed on a liquid crystal display panel, so that luminance and white balance of the first image signal displayed in a camera mode become equal to or similar to luminance and white balance of a second image signal displayed in a normal mode. In addition, the present invention enables the function of image correction of the conventional camera to be duplicated with respect to a function of the liquid crystal display device so that time and cost for tuning the camera and the liquid crystal display device are reduced.

It will be apparent to those skilled in the art that various modifications and variation can be made in the present invention without departing from the spirit or scope of the invention. Thus, it is intended that the present invention cover the modifications and variations of this invention provided that they fall within the scope of the appended claims and their equivalents.

What is claimed is:

1. A mobile terminal comprising a camera for photographing an external image, a memory unit for storing a first image signal photographed by the camera in a normal mode and a second image signal displayed in a camera mode, and a liquid crystal display device for displaying one of the first image signal and the second image signal, the liquid crystal display device, comprising:
   a key pad on the mobile terminal to supply a selection signal for selecting the normal mode or the camera mode;
   a control unit to control the mobile terminal by receiving the selection signal and supplying a normal mode control signal or a camera mode control signal, the camera receives the camera mode control signal, photographs an external image, and supplies the second image signal to the memory unit, the memory unit stores the first image signal displayed in the normal mode and the second image signal supplied by the camera;
   a timing controller for receiving said one of the first image signal and the second image signal from the memory unit in response to the normal mode control signal or the camera mode control signal, for comparing the received image signal with a reference signal so as to generate a deviation signal, and for supplying one of a first corrected image signal and a second corrected image signal in response to the deviation signal, said first corrected image signal and said second corrected image signal having equal white balance and luminance;
   a liquid crystal display panel having a plurality of pixels formed by a plurality of scan lines and a plurality of data lines for displaying the first corrected image signal in the camera mode, and for displaying the second corrected image signal in the normal mode;
   a scan driver for supplying a scan signal to the liquid crystal display panel via the plurality of scan lines; and
   a data driver for supplying said one of the first corrected image signal and the second corrected image signal, via the plurality of data lines, to the plurality of pixels selected by the scan signal, wherein the timing controller further comprises:
   a first comparator for receiving one of the first image signal and the second image signal, and for comparing the received image signal with a white balancing reference signal so as to supply a first deviation signal;
   a second comparator for receiving one of the first image signal and the second image signal, and for comparing the received image signal with a gamma correction reference signal so as to supply a second deviation signal;
   a first corrector for white-balancing said one of the first image signal and the second image signal in response to the first deviation signal supplied by the first comparator; and
   a second corrector for gamma-correcting said one of the first image signal and the second image signal in response to the second deviation signal supplied by the second comparator,
   wherein when the first deviation signal is not generated but the second deviation signal is generated, the white balancing for the first or second image signal is not performed by the first corrector, but the gamma correction is performed by the second corrector,
   wherein when the first deviation signal is generated but the second deviation signal is not generated, the white balancing for the first or second image signal is performed by the first corrector, and
   wherein when both the first deviation signal and the second deviation signal are generated, the white-balancing and the gamma-correction for the first or second image signal are performed by the first and second corrector.

2. The mobile terminal of claim 1, further comprising operator input means for inputting a selection signal for selecting the normal mode and the camera mode.

3. The mobile terminal of claim 2, further comprising a control unit for receiving the selection signal from the operator input means, said control unit being connected to said camera for transmitting a camera mode control signal thereto, and connected to said memory unit for transmitting a normal mode control signal thereto.

4. The mobile terminal of claim 3, further comprising a radio frequency (RF) circuit unit connected to said control unit for performing communication for the mobile terminal, and an audio circuit unit connected to said control unit for generating an audio signal for the mobile terminal.

5. A mobile terminal comprising a camera for photographing an external image, a memory unit for storing a first image signal photographed by the camera in a normal mode and a second image signal displayed in a camera mode, and a liquid crystal display device for displaying one of the first image signal and the second image signal, said liquid crystal display device, comprising:
   a key pad on the mobile terminal to supply a selection signal for selecting the normal mode or the camera mode;
   a control unit to control the mobile terminal by receiving the selection signal and supplying a normal mode control signal or a camera mode control signal, the camera receives the camera mode control signal, photographs an external image, and supplies the second image signal to the memory unit, the memory unit stores the first image signal displayed in the normal mode and the second image signal supplied by the camera;
   an image corrector for receiving said one of said first image signal and said second image signal from the memory unit in response to the normal mode control signal or the camera mode control signal, for comparing the received image signal with a reference signal so as to generate a deviation signal, and for supplying one of a first corrected image signal and a second corrected image signal in response to the deviation signal;
   a timing controller for supplying a control signal for displaying an image, and for supplying said one of the first corrected image signal and the second corrected image signal supplied by the image corrector, said first corrected image signal and said second corrected image signal having equal white balance and luminance;

a liquid crystal display panel having a plurality of pixels formed by a plurality of scan lines and a plurality of data lines for displaying the first corrected image signal in the camera mode, and for displaying the second corrected image signal in the normal mode;

a scan driver for supplying a scan signal to the liquid crystal display panel via the plurality of scan lines; and a data driver for supplying said one of the first corrected image signal and the second corrected image signal, via the plurality of data lines, to the plurality of pixels selected by the scan signal, wherein the image controller further comprises:

a first comparator for receiving one of the first image signal and the second image signal, and for comparing the received image signal with a white balancing reference signal so as to supply a first deviation signal;

a second comparator for receiving one of the first image signal and the second image signal, and for comparing the received image signal with a gamma correction reference signal so as to supply a second deviation signal;

a first corrector for white-balancing said one of the first image signal and the second image signal in response to the first deviation signal supplied by the first comparator; and a second corrector for gamma-correcting said one of the first image signal and the second image signal in response to the second deviation signal supplied by the second comparator, wherein when the first deviation signal is not generated but the second deviation signal is generated, the white balancing for the first or second image signal is not performed by the first corrector, but the gamma correction is performed by the second corrector, wherein when the first deviation signal is generated but the second deviation signal is not generated, the white balancing for the first or second image signal is performed by the first corrector, and wherein when both the first deviation signal and the second deviation signal are generated, the white-balancing and the gamma-correction for the first or second image signal are performed by the first and second corrector.

6. The mobile terminal of claim 5, further comprising operator input means for inputting a selection signal for selecting the normal mode and the camera mode.

7. The mobile terminal of claim 6, further comprising a control unit for receiving the selection signal from the operator input means, said control unit being connected to said camera for transmitting a camera mode control signal thereto, and connected to said memory unit for transmitting a normal mode control signal thereto.

8. The mobile terminal of claim 7, further comprising a radio frequency (RF) circuit unit connected to said control unit for performing communication for the mobile terminal, and an audio circuit unit connected to said control unit for generating an audio signal for the mobile terminal.

* * * * *